United States Patent [19]
Pulver

[11] Patent Number: 5,848,658
[45] Date of Patent: Dec. 15, 1998

[54] ADJUSTABLE FRONT WHEEL STABILIZER FOR POWER WHEELCHAIR

[75] Inventor: Dale A. Pulver, University Heights, Ohio

[73] Assignee: Invacare Corporation, Elyria, Ohio

[21] Appl. No.: 944,194

[22] Filed: Oct. 6, 1997

[51] Int. Cl.⁶ ........................................ B60K 1/00
[52] U.S. Cl. ................ 180/65.1; 140/907; 280/304.1
[58] Field of Search ..................... 180/6.5, 65.1, 180/65.6, 65.5, 907; 280/250.1, 301, 704.1; 301/5.1, 5.21

[56] References Cited

U.S. PATENT DOCUMENTS

| | | | |
|---|---|---|---|
| 5,340,139 | 8/1994 | Davis | 280/304.1 |
| 5,419,571 | 5/1995 | Vaughan | 280/250.1 |
| 5,669,619 | 9/1997 | Kim | 160/907 |
| 5,697,465 | 12/1997 | Kruse | 180/907 |

*Primary Examiner*—Richard M. Camby
*Attorney, Agent, or Firm*—Hudak & Shunk Co., L.P.A.

[57] ABSTRACT

A mid-wheel drive or front wheel drive power wheelchair includes a front stabilizer extending from the frame. It includes a first arm pivotally mounted to the frame at a first or upper end and a stabilizer wheel is mounted adjacent a second end. A second arm of the stabilizer assembly is pivotally connected at opposite ends to the stabilizer wheel axis and lower end of the shock assembly associated with the suspension arm. The first arm includes a dampening cylinder surrounded by a spring. The spring force preload can be selectively altered and, independently, the height of the stabilizer wheel may be adjusted.

8 Claims, 7 Drawing Sheets

ADJUSTABLE FRONT WHEEL STABILIZER FOR POWER WHEELCHAIR

BACKGROUND OF THE INVENTION

This application relates to wheelchairs, and more particularly to power wheelchairs, in which a front wheel or mid-wheel drive assembly is used. However, various aspects of the present invention may be used in related environments and applications.

Commonly owned U.S. Pat. No. 5,575,348 is directed to a power wheelchair that is a rear wheel drive arrangement. That is, enlarged drive wheels are disposed toward a rear portion of the frame and smaller diameter driven wheels are caster mounted on a front end of the frame. Thus, even though the axis of the rear drive wheels is disposed beneath the seat, the drive wheels are more closely disposed adjacent a rear portion of the seat or rear portion of the frame.

An alternative arrangement mounts the drive wheels at a more central location beneath the seat or closer to the front of the frame. These mounting arrangements provide what is commonly referred to as a mid-wheel drive or a front wheel drive power wheelchair arrangement. For purposes of brevity, the mid-wheel drive and front wheel drive styles will both be referred to as front wheel drive arrangements, although it is understood that particular details of the present invention apply to both.

The front wheel drive wheelchair typically includes a stabilizer that extends forwardly from the frame so that the wheelchair does not tip too far forwardly during operation. It is common to employ a wheel at the end of the stabilizer that is suspended for selective engagement with the ground surface. It is common that the wheel does not engage the ground surface during normal operation of the wheelchair.

Power wheelchairs are manufactured for use by different weight passengers. Thus, it is desired to alter the height of the stabilizer wheel from the ground surface to match a particular wheelchair user, a feature heretofore not adequately addressed by prior art wheelchairs. Adjusting the height of the front stabilizer allows the wheelchair to clear small height obstacles and yet be effective as an anti-tip assembly in the forward direction. Known arrangements do not provide an effective solution to this problem.

Likewise, known front stabilizers do not permit variation in the preload force. That is, the front stabilizer will counteract tipping at a predetermined force. It is desirable to adjust the preload force so that the sensitivity of the front stabilizer can be altered. Again, prior arrangements of front stabilizers for front wheel drive wheelchairs have been ineffective in that regard. For example, even though known front stabilizers vary the preload force, they necessarily result in a change in the height of the stabilizer wheel also.

Accordingly, it is desired to develop and provide a front wheel stabilizer for a power wheelchair that may be independently adjusted for height and preload force.

SUMMARY OF THE INVENTION

The present invention contemplates a new and improved power wheelchair that overcomes the above referenced problems and others and provides a simple, economical structure that is easily adjusted.

According to a more limited aspect of the invention, the wheelchair includes a frame having a longitudinal frame portion that extends fore and aft, and a lateral frame member that extends generally perpendicular thereto. Drive wheels are rotatably mounted to the frame beneath a seat and at least one stabilizer wheel extends from the front end of the frame.

According to another aspect of the invention, the front stabilizer is adjustable in height relative to the frame to accommodate different users.

According to yet another aspect of the invention, the wheelchair includes a pair of front stabilizers disposed on each side of the wheelchair. Each stabilizer includes a first arm that extends between the frame and the stabilizer wheel, and a second arm extending between the stabilizer wheel axis and a pivot on the frame spaced from the first arm attachment point.

A principal advantage of the invention is the ability to independently adjust the height and preload of the front stabilizer for the wheelchair to accommodate different users.

Still another advantage of the invention resides in the simplified structure that allows access to the adjustment mechanism without difficulty.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described below. The accompanying illustrations are not intended to limit the scope of the invention, but rather show the preferred embodiments only. Particularly.

DETAILED DESCRIPTION OF THE PREFERRED EMBODIMENTS

Figure 1A:
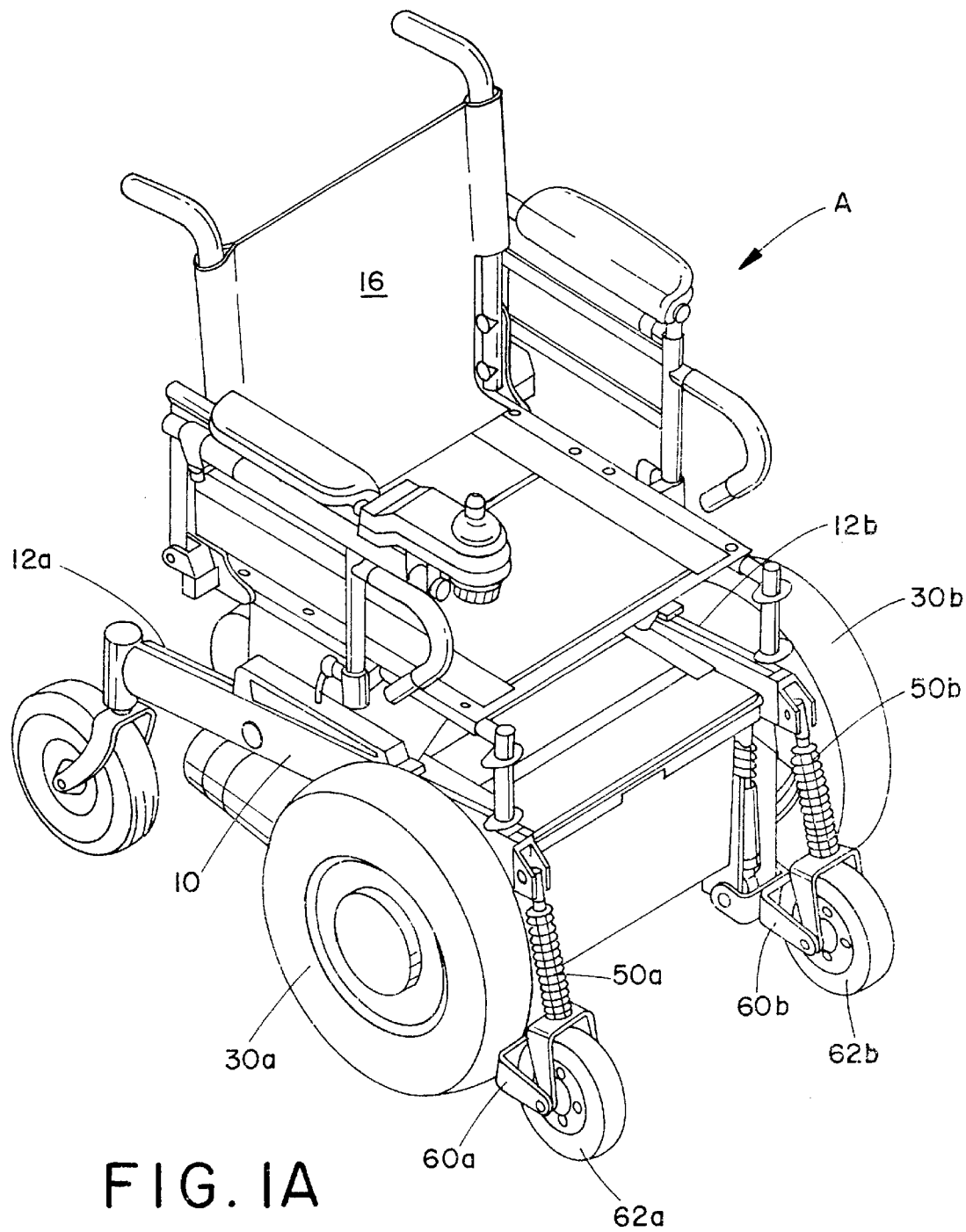
FIGS. 1A and 1B is a perspective view of respective front wheel drive wheelchair embodiments incorporating an adjustable front wheel stabilizer.

Referring now to the drawings which illustrate the preferred embodiments of the invention only and are not intended to limit the invention, the Figures show a power wheelchair A, again, either a mid-wheel drive arrangement (FIGS. 1A and 1B) or a front wheel drive arrangement(not shown). For convenience, the drawings occasionally identify selected components with a suffix "a" or "b" which is intended to represent that the wheelchair includes a pair of the described component (e.g. left-hand and right-hand components), it being understood that the description of one is applicable to the other unless noted to the contrary. Moreover, like elements in the different embodiments will be described with like numerals for consistency.

Figure 1B:
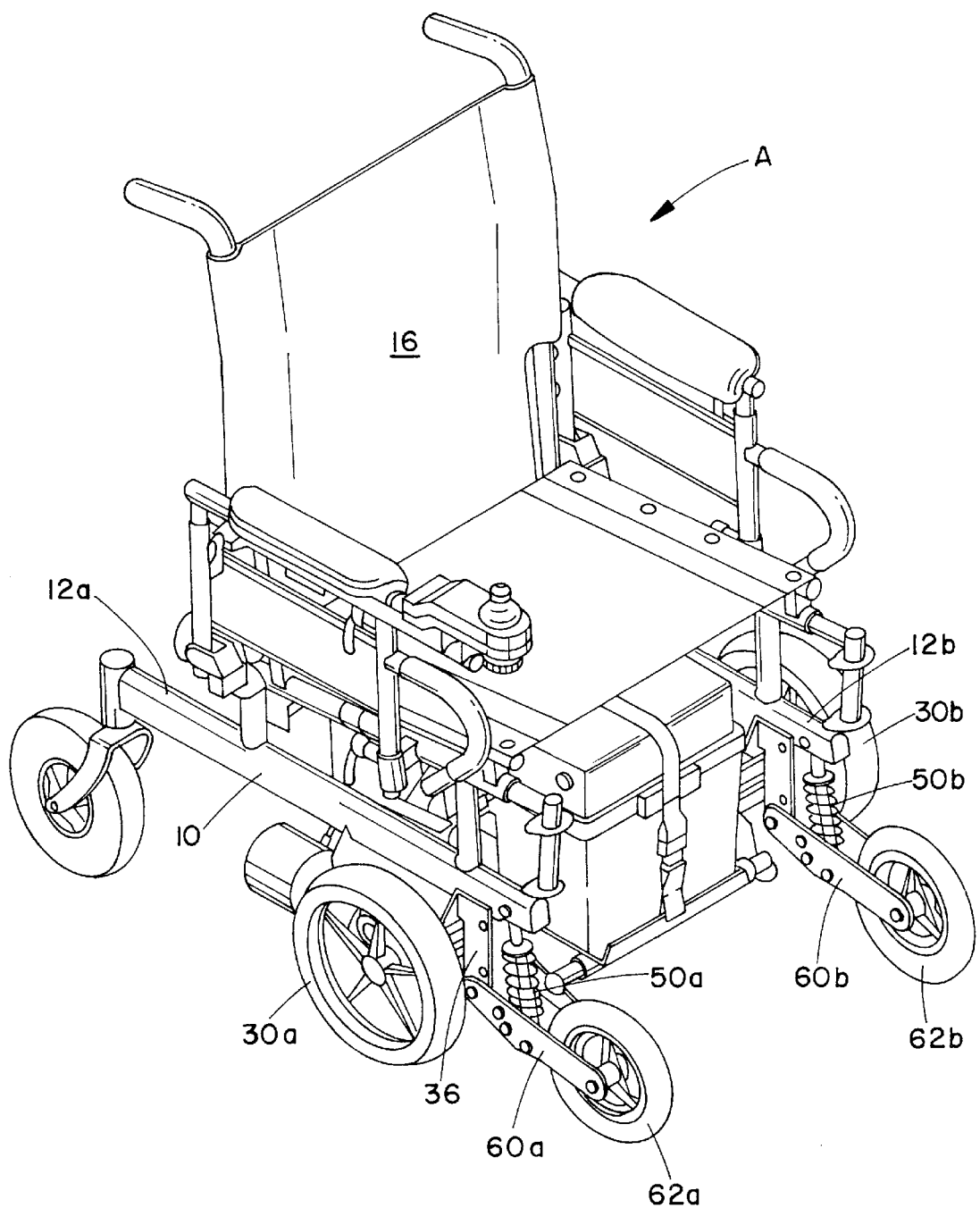

Generally, and with reference to FIGS. 1A and 1B, the wheelchair A includes a rigid frame 10 which in a preferred arrangement has first and second longitudinal frame members 12a, 12b that are interconnected by a cross frame member 14, whether it be a single cross frame member or a pair of cross frame members. Each of the frame members is preferably of tubular construction that adds rigidity and strength to the frame assembly. A seat 16 is shown mounted to the longitudinal frame members. It will be understood that a variety of conventional seats can be alternatively secured to the frame as desired. Likewise, shown extending from a front edge of the seat support assembly is a front rigging or footrest assembly 18. Again, the footrest is of conventional structure so that further discussion herein is deemed unnecessary to a full and complete understanding of the present invention.

Figure 4A:
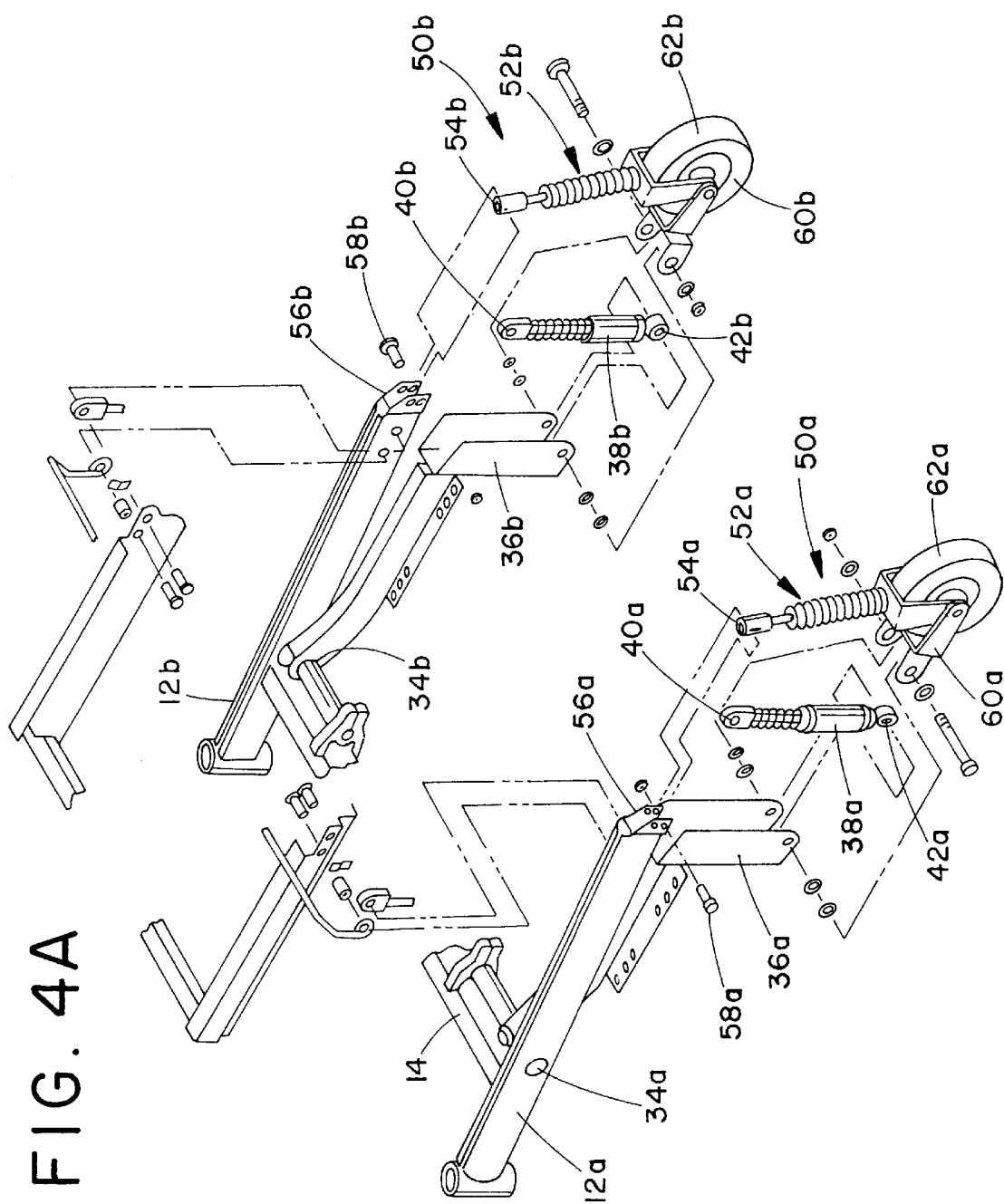
FIG. 4A is an exploded perspective view of the shock and stabilizer mountings of the FIG. 1A embodiment and FIG. 4B is a partially exploded view of the front stabilizer used in the embodiment of FIG. 1B.
Figure 4B:
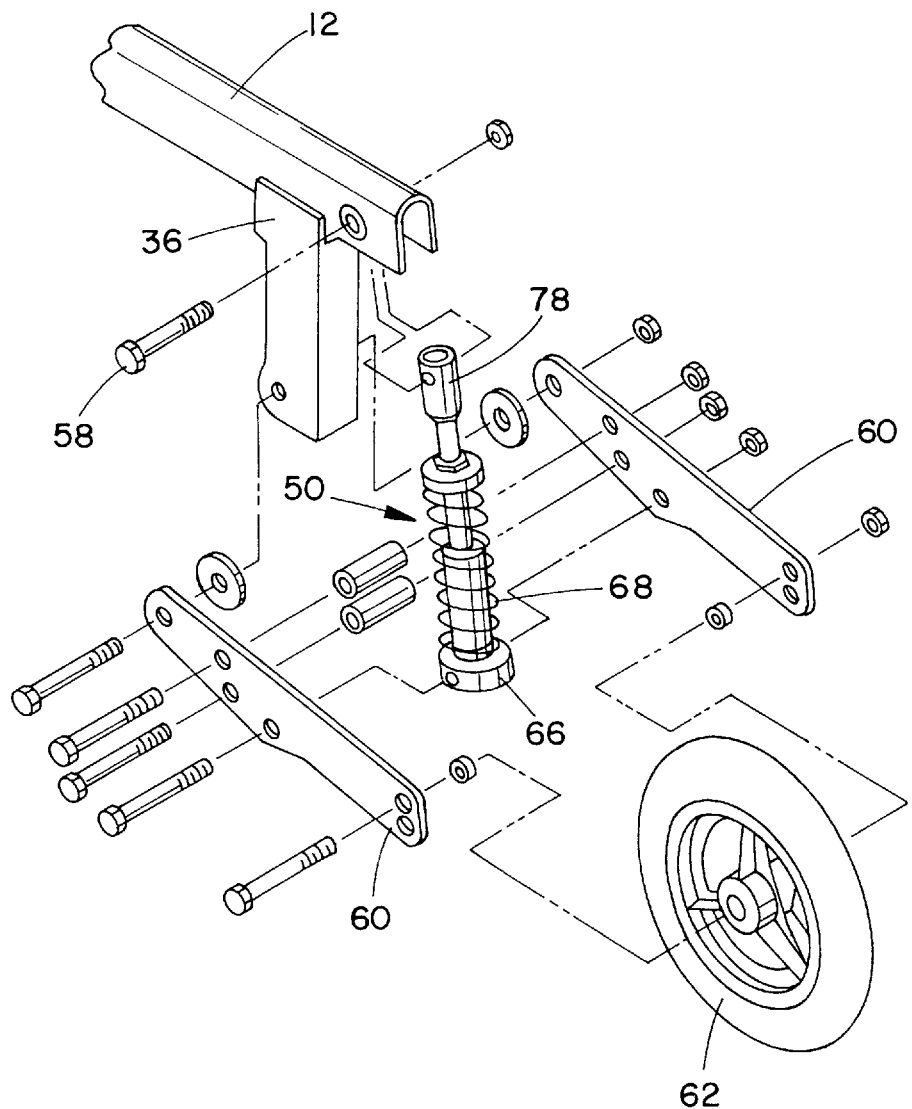
Figure 5B:
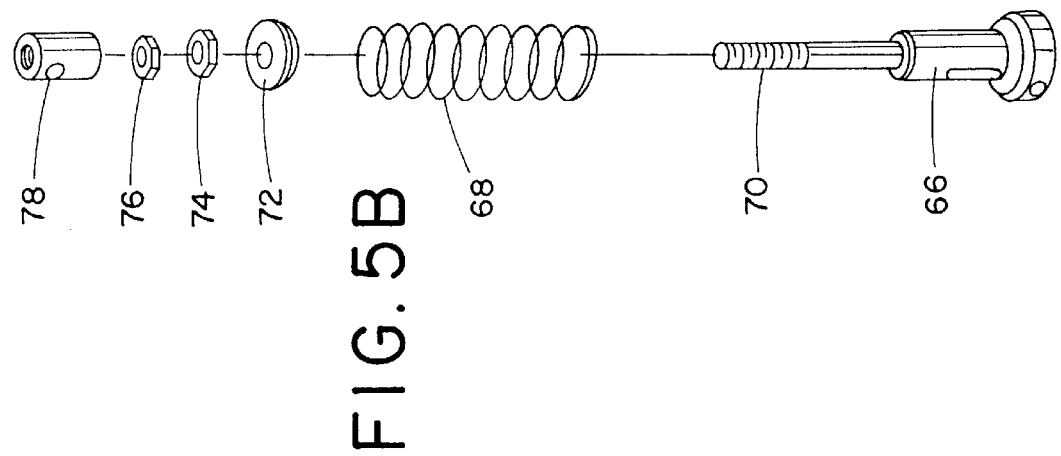
FIG. 5B is an exploded view of the adjustable cylinder of FIG. 1B.
Figure 5A:
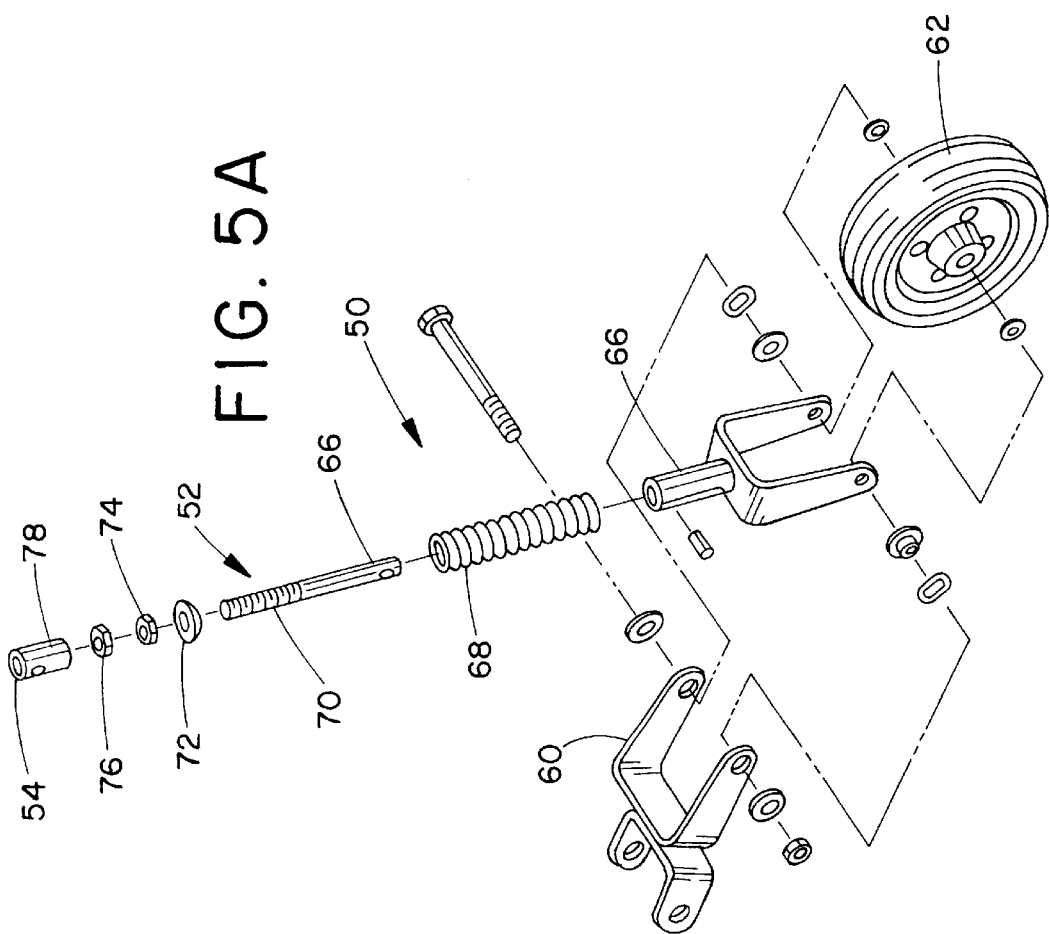
FIG. 5A is an exploded perspective view of a preferred form of front stabilizer used in the embodiment of FIG. 1A

At a first or forward end of the frame, and preferably beneath a central portion of the seat are mounted the enlarged drive wheels 30. Each drive wheel is rotatably mounted to a suspension arm assembly 32 that is pivotally mounted at one end 34 (FIG. 4B) to an intermediate portion of the frame. Although not shown, drive motors are also secured to the frame for operative connection with the respective drive wheels 30. The embodiment of FIG. 1A includes a suspension assembly while the FIG. 1B embodiment does not. Thus, in the FIG. 1A version a generally U-shaped plate 36 is secured to the suspension arm while in FIG. 1B, the plate 36 is secured to the frame. In either event, the plate is either connected directly or indirectly to the frame.

Enclosed within the plate 36 of FIG. 1A is a shock assembly or dampener 38, a first or upper end 40 of which is secured to the front end of the frame while a second or lower end 42 is secured to a lower region of the plate. As will be appreciated, the suspension assembly is intended to dampen or attenuate shocks and vibrations from the drive wheels that would otherwise be transferred to the remainder of the wheelchair frame. The dampener counteracts the shock forces in a manner well known in the art.

Since FIG. 1B does not include a suspension assembly, there is no shock absorber and the plate is connected directly to the frame.

A front stabilizer assembly 50 is also mounted to the front end of the frame. It includes a first arm 52 that is pivotally mounted at an upper end 54 to a front edge of the longitudinal frame. For example, a U-shaped gusset 56 secured to the frame is adapted to receive a bolt 58 that acts as a pin mounting for pivotally receiving the upper end of the first arm in the embodiment of FIG. 1A. A second or lower end of the first arm receives a stabilizer wheel 62. The wheel selectively rotates about an axis 64, which axis may vary in height relative to the ground surface.

Additionally, the first arm preferably includes a dampening member defined by cylinder 66 surrounded by spring 68. The cylinder includes a housing from which an elongated reciprocating member 70 extends and over which the spring is received. Preferably, the reciprocating member is threaded at its upper end. The reciprocating member 70 receives an annular plate 72 that abuts against an upper end of the spring, an adjustment nut 74, a jam nut 76, and stabilizer cylinder barrel 78. The barrel 78 is connected to the frame by means of the threaded fastener 58.

Figure 2:
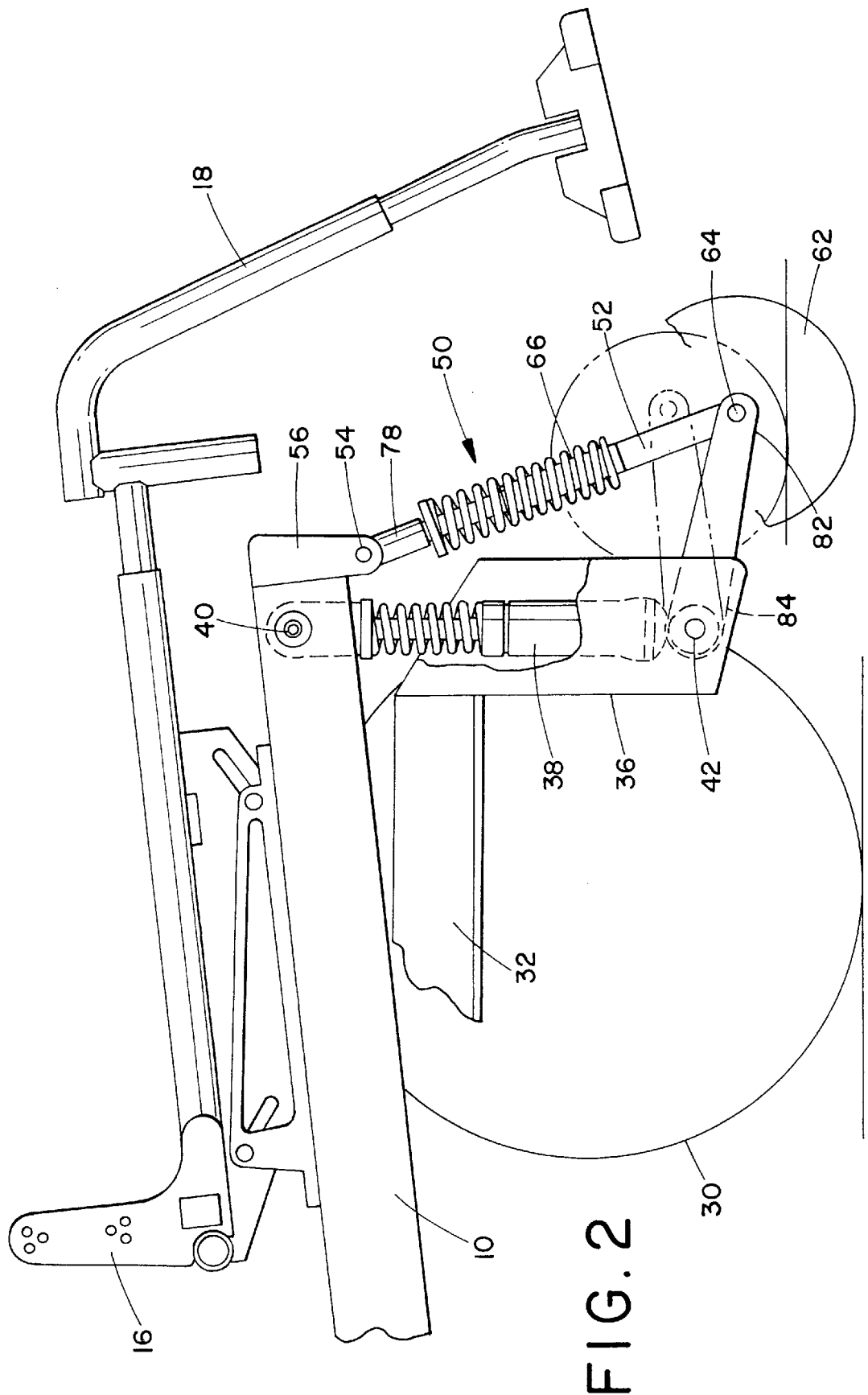
FIG. 2 is an elevational view of the front wheel drive power wheelchair of FIG. 1A incorporating a front wheel stabilizer.
Figure 3:
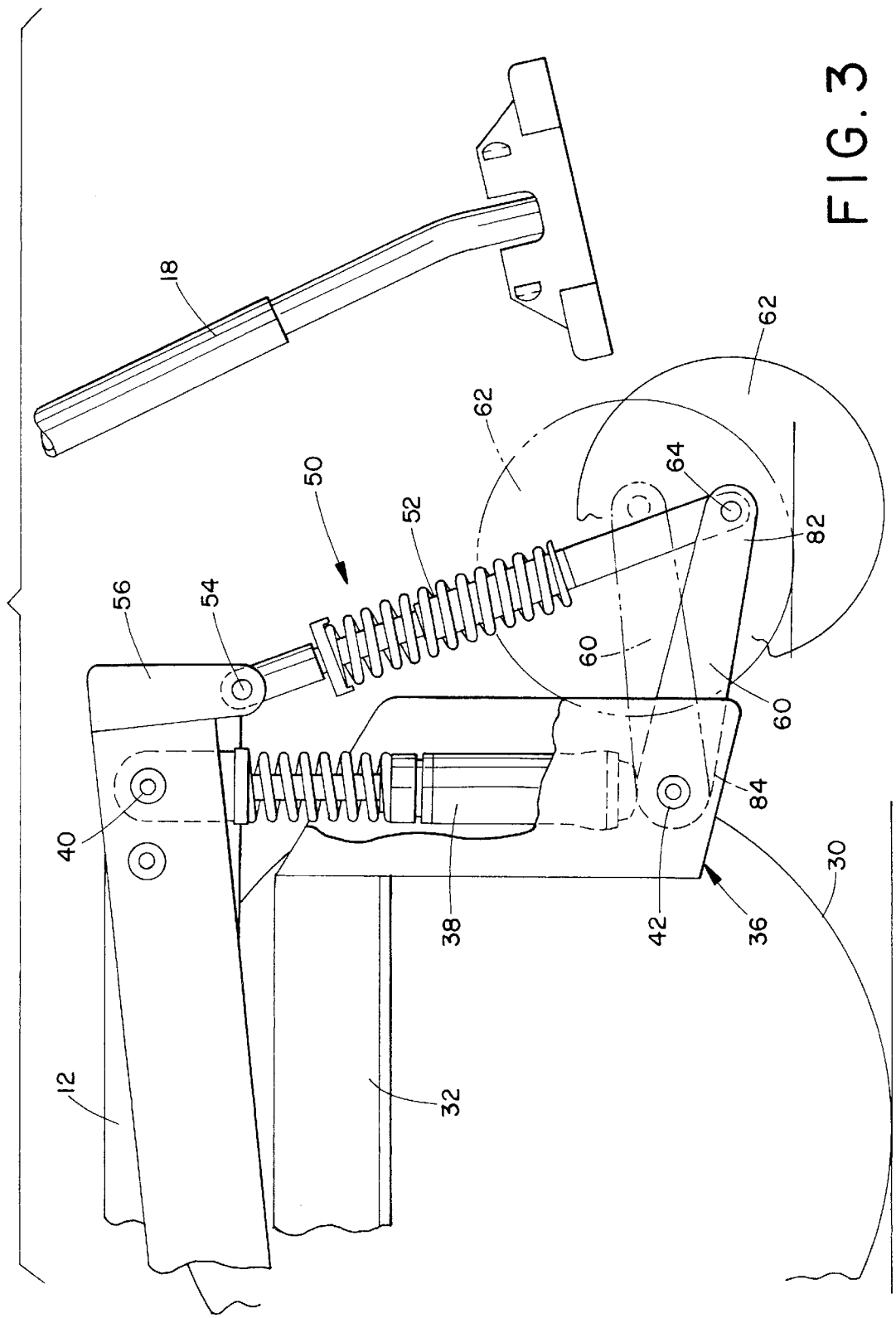
FIG. 3 is an enlarged view of the front suspension and front stabilizer assemblies of the FIG. 1A embodiment.

The second arm 60 defines a link that interconnects the front stabilizer to the suspension assembly in the embodiment of FIG. 1A. More particularly, a first end 82 of the second arm is connected to the rotational axis of the stabilizer wheel, while a second end 84 is secured to the lower end of the shock absorber at its connection with plate 36. Thus, upward movement of the stabilizer wheel is generally pivoted about the fastener extending through the lower end of the shock assembly 42. The extent of movement of the front stabilizer wheel is represented in solid and phantom lines in FIGS. 2 and 3, the downwardly biased position being normally spaced from the ground surface and the stabilizer wheel engaging the ground in the compressed position.

In FIG. 1B, the first arm is directly connected to the frame via a pivot connection at its first or upper end, while the second or lower end of the first arm is connected to the second arm at a region intermediate the first and second ends thereof. In substantially all other respects, however, the front stabilizer of FIG. 1B is structurally and functionally similar to that of FIG. 1A.

The downward position shown in solid line is spaced from the ground surface. This spacing allows the wheelchair to clear low-height obstacles without the front stabilizer dragging on the ground.

As will be appreciated, different users have different weights so that adjustment of the front stabilizer to provide proper stability and prevent the foot rigging from dragging on the ground is desired. Height adjustment is provided via the barrel 78 received on the threaded end of reciprocating member 70. Rotating the barrel relative to the threaded end of the reciprocating member either raises or lowers the height of the stabilizer wheel from the ground.

Independently of the height adjustment, rotating the adjustment nut 74 allows the preload of the spring 68 to be adjusted. That is, rotating the adjustment nut 74 in one direction or the other either advances the nut and the annular plate 72 downwardly or upwardly along the threaded portion 70 of the cylinder. Since the lower end of spring 68 is fixed against movement by abutting the fork assembly mounted to the stabilizer wheel, adjustment of the upper end of the spring, i.e., via the annular plate 72, allows the preload force of the spring to be altered. Once the desired location is obtained, the length of the spring is set, thus providing a desired preload force. This allows adjustment of the stabilizer preload force independent of the height adjustment.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A power wheelchair comprising:

a frame;

wheels rotatably mounted to the frame;

a suspension assembly interposed between the frame and the wheels;

a drive assembly secured to the frame and operatively associated with the wheels; and a stabilizer mechanism extending from a front portion of the frame including a first arm mounted at a first end to the frame and a second end that extends toward the ground surface, and a second arm having a first end connected to a smooth surface urged toward the ground surface at a predetermined preload force and adapted for selective engagement with the ground surface and a second end pivotally mounted to the frame, the stabilizer mechanism being mounted for independent height and preload force adjustment.

2. The power wheelchair of claim 1 wherein the smooth surface is a wheel rotatably connected to the first end of the second arm.

3. The power wheelchair of claim 2 wherein the second end of the first arm is connected to the second arm at a region interposed between the first and second ends of the second arm.

4. The power wheelchair of claim 1 wherein the height of the wheel above the ground surface is adjustable by selectively extending and contracting the length of the first arm.

5. The power wheelchair of claim 1 wherein the smooth surface is a wheel rotatably connected to the second end of the first arm.

6. The power wheelchair of claim 1 wherein the stabilizer mechanism includes a spring that exerts a preload force against the smooth surface, the preload force being adjustable independently of the height.

7. The power wheelchair of claim 1 wherein the first arm includes a dampening spring that urges the second end of the first arm toward the ground surface.

8. The power wheelchair of claim 7 wherein a preload force of the dampening spring is adjusted by selectively compressing or decompressing the spring.

* * * * *